United States Patent
Louwsma

(10) Patent No.: US 7,834,943 B2
(45) Date of Patent: Nov. 16, 2010

(54) REDUCTION OF CROSS-TALK IN VERTICAL DIRECTION FOR A DUAL VIEW DISPLAY DEVICES

(75) Inventor: Hendrik Louwsma, Heerlen (NL)

(73) Assignee: TPO Displays Corp., Miao-Li County (TW)

( * ) Notice: Subject to any disclaimer, the term of this patent is extended or adjusted under 35 U.S.C. 154(b) by 867 days.

(21) Appl. No.: 11/609,404

(22) Filed: Dec. 12, 2006

(65) Prior Publication Data

US 2008/0137012 A1 Jun. 12, 2008

(51) Int. Cl.
  *G02F 1/1335* (2006.01)
  *G02F 1/1333* (2006.01)
  *G02B 27/22* (2006.01)

(52) U.S. Cl. .................... 349/15; 349/106; 349/110; 359/462

(58) Field of Classification Search .................... 349/15, 349/106, 110; 359/462
  See application file for complete search history.

(56) References Cited

U.S. PATENT DOCUMENTS 6,445,406 B1 * 9/2002 Taniguchi et al. ............. 348/51

2003/0090608 A1 * 5/2003 Kim et al. .................... 349/110
2004/0150767 A1 * 8/2004 Kim ............................. 349/74

FOREIGN PATENT DOCUMENTS

CN 1797147 7/2006

OTHER PUBLICATIONS

Chinese language office action dated Apr. 14, 2010.
English language translation of abstract of CN 1797147 (published Jul. 5, 2006).

\* cited by examiner

*Primary Examiner*—Michael H Caley
(74) *Attorney, Agent, or Firm*—Thomas, Kayden, Horstemeyer & Risley, LLP

(57) ABSTRACT

A display device for displaying a first view and a second view incorporates: a color generating layer; a barrier layer (SB3); and a light source; the color generating layer includes a plurality of color elements arranged as pixel elements, the pixel elements being arranged in a horizontal direction and in a vertical direction; each color element having a pitch (Py) in the vertical direction; the light source being arranged such that, during use, light generated by the light source passes through the barrier layer and the plurality of color elements of the color generating layer; the barrier layer, comprising a stepped barrier pattern of blocking structures and openings extending in the horizontal and the vertical directions, being arranged for defining a viewing angle of the first view and a viewing angle of the second view; and the light source being arranged for generating collimated light.

19 Claims, 10 Drawing Sheets

REDUCTION OF CROSS-TALK IN VERTICAL DIRECTION FOR A DUAL VIEW DISPLAY DEVICES

FIELD

The present invention relates to dual view pixel matrix display devices.

BACKGROUND

A flat panel display such as an liquid crystal (LC) pixel matrix display or an organic light emitting diode (OLED) pixel matrix display can function as a dual view display, in which in a horizontal direction a first view can be generated along a first viewing angle range and a second view can be generated along a second viewing angle range. Such a dual view display is capable of generating two different views at the same time by assigning one half of the pixels of the pixel matrix to the first view and another half of the pixels of the pixel matrix to the second view.

A well known method to obtain two views from a single pixel matrix display is the application of a single straight barrier, which incorporates vertical openings in an otherwise opaque barrier layer. The vertical openings extend substantially continuous along the vertical length of the pixel matrix. However, such a solution to obtain Dual view from a single pixel matrix is adversely affected by a relatively poor horizontal resolution. To solve the poor resolution so-called stepped barriers are applied. A particular application is the so-called double stepped barrier arrangement (double barrier). Such a double barrier comprises a first barrier layer below and a second barrier layer above the pixel matrix. The barrier layers comprise two-dimensional patterns that allow that the first and second views to be generated by the pixel matrix while using a single light source. However, it has been found that the use of two barrier layers adversely affects the construction of the dual view display since a variation of the thickness of the glass substrates carrying the barrier layers and the pixel matrix display can affect the quality of a produced image.

Dual view displays are used, for example, in automotive applications as displays that can be used simultaneously by a driver and a passenger. The driver will see the first view, which for example shows a display that relates to parameters of the automobile such as a route navigation display. The passenger may see a second view, for example a TV broadcast or a video.

For reasons of safety, the driver should not see the second view while driving. Therefore, cross-talk of the first view and the second view, i.e., a (partial) perception of the second view (for the passenger) within the viewing angle of the first view (for the driver), should be avoided.

It is recognized that cross-talk between first and second views may occur not only in the horizontal direction but also the vertical direction. In particular, at relatively large oblique angles in the vertical direction an undesired second view may be visible to the driver either directly or through a reflection of the undesired second view in a front windscreen of the automobile. In displays from the prior art, an undesired viewing in the vertical direction is suppressed by a Louvre film (or Light Control film (LCF)) to avoid reflection in the windscreen. Such a Louvre film is relatively expensive. Moreover, the Louvre film reduces a brightness of the display by about 30%.

FIG. 1 depicts a horizontal cross-section of a dual view display D1 using a double barrier. The dual view display D1 of the prior art shown here, using a double stepped barrier, is an LCD type display. The display comprises a color filter plate CF, a first barrier layer LR1, a second barrier layer LR2 and a backlight BL. The cross-section shown here is taken along a horizontal direction X of the display. For ease of explanation, the polarizers and liquid crystal elements are not indicated here.

The first barrier layer LR1 is arranged in a height direction Z between the backlight BL and a side of the color filter plate CF facing the backlight. The first barrier layer LR1 comprises a transparent carrier plate (such as a glass plate) on which blocking elements BS are arranged. The blocking elements BS are separated from each other by openings WO.

Above the color filter plate CF (along direction Z), i.e., at a side of the color filter plate not facing the backlight, the second barrier layer LR2 is arranged. The color filter plate CF comprises a transparent carrier plate on which a sequence of transparent color elements are arranged. The color elements comprise red elements R, green elements G and blue elements B, that are configured to generate light of a red color (R), green color (G) or blue (B) color, respectively, when, during use, light from the backlight BL passes through the respective color element. Next to the color filter plate CF, an array plate (not shown) is arranged, comprising array metals M2 (i.e., metallic connection line M2 and/or metallic light shield).

The opaque metallic connection line M2 and/or metallic light shield M2 are positioned in such a way that the color elements R, G, B appear to be separated from each other by a non-transparent interface area, which corresponds to the metallic connection line M2 and/or metallic light shield M2. For reasons of clarity, the array plate and color filter plate are shown here in a composition, and not as individual items. Below, the composition of the array plate and color filter plate will be referred to as the color filter plate, unless indicated otherwise. The metallic connection line and/or metallic light shield will be explained in more detail below.

The color elements R, G, B extend in columns along a vertical direction Y. The color elements R, G, B relate to sub-pixel elements, which in a combination comprise at least a red, a green and a blue element, are paired as a pixel element of the display. The R-G-B color elements are dedicated to either the first view or the second view. In FIG. 1, color elements indicated by R1, G1, B1 are dedicated to the first view, while color elements indicated by R2, G2, B2 are dedicated to the second view. Note that due to the geometry of the barriers and the required views, pixels are paired in an interleaved order. In FIG. 1, red color element R1 for the first view is adjacent to green element G2 for the second view. Green element G2 is next to blue element B1 for the first view. The blue element B1 is next to red element R2 for the second view V2. The red color element R2 for the second view is adjacent to green element G1 for the first view. Green element G1 is next to blue element B2 for the second view. Blue element B2 is next to a next red element R1 for the first view V1. This pattern R1-G2-B1-R2-G1-B2 is repeated along the direction X.

A horizontal pitch Px of the color elements and a horizontal width Wmx of one metal connection line M2 is indicated in FIG. 1. Note that the configuration of the double stepped barrier is such that the horizontal width of one blocking structure BS plus one opening WO equals two horizontal pitches Px: WO+BS=2*Px, while the horizontal width of one blocking structure BS equals the horizontal width of one opening WO.

The first barrier layer LR1 comprises openings between the blocking structures BS. The locations of these openings of LR1 in the horizontal direction X coincide with blocking structures BS of the second barrier layer LR2. This will be illustrated in FIG. 2 in more detail.

As illustrated by arrows A1, A2, color element B1 contributes to the first view under first viewing angle V1. The color element R2 is adjacent to B1 to the second view under second viewing angle V2 as illustrated by arrows A3, A4. Please note that a gap Gp occurs between the viewing angles V1 and V2 (between arrow A2 and arrow A3). In this manner no cross-talk between the first and second view exists. Note that as illustrated in FIG. 2, the construction of the double barrier is substantially similar in both horizontal and vertical directions. Thus, cross-talk between the first and second view in both the horizontal and vertical directions is absent.

Not shown in this cross-section, for reasons of clarity, is a light-switching layer which comprises light switching elements that are individually associated with a single color element for controlling transmission of light through that single color element.

Light switching elements may be LCD elements which, under control of an electric signal, can set either an opaque state or a transparent state or in one or more intermediate semi-transparent states. Each LCD element typically comprises a layer of liquid crystal material and a thin film transistor (TFT) circuit for controlling the state of the liquid crystal layer. Each light switching element is arranged next to the associated single color element on the color filter plate CF (i.e. in the path of the light passing through the color element).

Each metal connection line M (that extends in a vertical direction Y perpendicular to the plane of drawing) is coupled to a row of TFT circuits. Below this will be explained in further detail.

Also not shown in this cross-section, for reasons of clarity, are first and second polarizing layers. The first polarizing layer is located as a first outer layer between backlight BL and the first lower barrier layer LR1, and the second polarizing layer is located above the second barrier layer LR2 as a second outer layer.

FIGS. 2a, 2b depict a top-view layout of the barrier layers below and above the pixel matrix layer, respectively, as used in the dual view display D1 of FIG. 1. In particular, FIGS. 2a, 2b illustrate the extent of the first and second barrier layers LR1, LR2 in the horizontal direction X and the vertical direction Y. The blocking structures BS of each barrier layer LR1, LR2 are indicated by dark areas while the openings in each of the barrier layers are indicated by the light areas.

As mentioned above, the first and second barrier layers are in 'anti-phase': a position of an opening in one barrier layer being covered in the perpendicular direction Z by a blocking structure in the other barrier layer. Also note that besides a difference in vertical and horizontal dimensions, the barrier layers are structured similarly in both directions. The difference in horizontal and vertical dimension relates to the aspect ratio of a sub-pixel: a horizontal width of a sub-pixel is about one third of the vertical width of the sub-pixel. Note that this implies that in the direction Y, the vertical width of an opening plus the vertical width of one blocking structure equals two times a pitch in the vertical direction of one color element including the vertical width of one metal connection line running in the horizontal direction.

As described above, the double barrier dual view display D1 of the prior art requires the use of two barrier layers. This adversely affects the construction of the Dual view display since a variation of the thickness of the glass substrates carrying the barrier layers and the pixel matrix display can affect the quality of a produced image. Moreover, such a double glass layer construction requires two relatively thin glass plates, which results in relatively higher costs for the display.

Note also that due to the presence of these two thin glass plates, the variations of thickness of each glass plate must be less than for thickness variations of a single glass plate to obtain a view with similar optical properties in both cases. Also, thinner glass plates are more prone to fracture and damage. For these reasons, dual view displays are preferably constructed by means of a single barrier layer.

FIG. 3 depicts a top view of first stepped barrier. The first stepped barrier SB1 is a single barrier layer capable of providing dual view in the horizontal direction. Blocking structures BS are indicated by dark areas and openings in the barrier layer SB1 are indicated by light areas.

The blocking structures are arranged in rows of a vertical width Wy. In each row, the blocking structures and openings are shifted stepwise in the horizontal direction X over half of a horizontal width Wx. The horizontal width Wx corresponds to two times the horizontal pitch Px as described above.

The vertical width Wy of a row is substantially equal to the vertical width Py (shown in FIG. 4) of a single color element R1, R2 (sub-pixel) including the vertical width of one intermediate metal connection line (or light shield line) running in the horizontal direction. In FIG. 3, the vertical width of the openings WO is substantially equal to the vertical width Wy of a row. Advantageously, this stepwise arrangement of blocking structures may provide an increased (horizontal) resolution of perception by a user in comparison to the vertical line pattern of the straight barrier from the prior art.

The color elements R, G, B in the color filter plate CF are arranged in red, green and blue color stripes adjacent to each other in the horizontal direction X, while each color stripe extends along the vertical direction Y. The dimensions and positions of the color stripes relative to the openings will be described in more detail below.

FIG. 4 depicts a vertical cross-section of a dual view display using the first stepped barrier. The single stepped barrier SB1 is arranged at a distance d below the color filter plate CF, of which a color stripe CS is shown, for example a stripe of red color elements R.

In this arrangement, the color elements alternately contribute to the first view V1 and to the second view V2: color elements R1 of the color stripe contribute to the red component of the first view V1 and the elements R2 contribute to the red component of the second view V2.

A pitch Py in the vertical direction is equal to the vertical width of one color element including one metal connection line M. The vertical width WO of the openings of the single barrier layer SB1 is substantially equal to the vertical width Wy of a row. Thus WO equals Py in this case.

Since, as above, in the vertical direction a width Wbs of a blocking structure BS plus the width WO of one opening equals two times the vertical pitch Py, in this case the vertical width of one opening WO equals the vertical width Wbs of one blocking structure BS.

It can be seen that the first view V1 and second view V2 show an overlap in the vertical direction Y. For one opening in the single barrier layer SB1, the first view V1 has an half viewing angle between arrow A1 and arrow A2, while the second view V2 has a viewing angle between arrow A3 and A4 for the same opening of the barrier layer. An overlapping angle OV occurs between arrow A3 and A2. Thus, this single barrier layer SB1 exhibits a cross-talk OV between first and second views which for practical purposes may not be acceptable. The usable width of view V1 in this configuration is limited by arrow A3 (boundary of second view V2).

FIG. 5 depicts a second stepped barrier SB2 which is a single barrier layer capable of providing dual view in the horizontal direction. Again, blocking structures BS are indicated by dark areas and openings in the barrier layer SB1 are indicated by light areas.

The blocking structures BS are arranged in rows of vertical width Wy. In each row the blocking structures and openings are, in comparison to an adjacent row, shifted stepwise in the horizontal direction X over half of a horizontal width Wx of one blocking structure BS plus one opening.

Like the first stepped barrier SB1, the second stepped barrier SB2 advantageously provides stepwise arrangement of blocking structures that may provide an increased (horizontal) resolution of perception by a user in comparison to the straight barrier as mentioned before. To avoid overlap of the first and second view V1, V2, the vertical width WO of openings in the second stepped barrier SB2 is chosen smaller than the vertical width Py of a color element (sub-pixel).

FIG. 6 depicts a vertical cross-section of a dual view display using the second stepped barrier. The second single stepped barrier SB2 is arranged at a distance d below the color filter plate CF, of which a color stripe CS is shown, for example a stripe of red color elements R.

In this arrangement, the elements R1 of the color stripe contribute to the red component of the first view V1 and the elements R2 contribute to the red component of the second view V2.

The vertical width WO of the openings of the single barrier layer SB2 is smaller than the vertical width Py of a single color element R1, R2.

The increase of the vertical width of the blocking structures with respect to SB1 is indicated by the extensions xb on the blocking structures along line Y.

Since, in the vertical direction the width Wbs of a blocking structure BS plus the width WO of one opening equals two times the vertical pitch Py and WO is chosen smaller than Wy, in this case the vertical width Wbs of one blocking structure BS is larger than the vertical pitch Py (note that Wy equals Py).

It can be seen that the first view V1 and the second view V2 show an overlap OV in the vertical direction Y which is strongly reduced in comparison to the overlap observed for a dual view display that uses the first single stepped barrier SB1. Note that in comparison to the first stepped barrier only, the vertical width WO of the openings and the vertical width of the blocking structures BS have been changed, all other sizes are the same as shown in FIG. 3 and FIG. 4.

Although the second stepped barrier SB2 strongly reduces the overlap OV of the first and second views V1, V2 in comparison to the overlap OV as shown by the dual view display using the first stepped barrier SB1, it is noted that the overlap OV may still be such that the driver may see the second view in a vertical direction above or below the first view. It is, however, possible to design the second stepped barrier SB2 in such a way that substantially no overlap occurs. A practically complete reduction of overlap or cross-talk by reducing the vertical width WO of an opening in the stepped barrier layer SB2 may be possible but at the same time this would strongly reduce the transmitted intensity of the first and second views V1, V2 in an undesirable manner.

The second stepped barrier has an adverse impact on the transmission of light of the dual view display. In comparison to a transmission of first stepped barrier SB1 (normalized at 100%), the second stepped barrier has a transmission of only about 60%. Disadvantageously, such a reduction of transmission would require a light source with higher intensity and a higher power consumption.

Disadvantageously, such a reduction of transmission would require a light source with higher intensity and a higher power consumption.

SUMMARY OF THE INVENTION

Display devices and related methods are provided. An embodiment of such a display device for displaying a first view and a second view incorporates: a color generating layer; a barrier layer (SB3); and a light source; the color generating layer includes a plurality of color elements arranged as pixel elements, the pixel elements being arranged in a horizontal direction and in a vertical direction; each color element having a pitch (Py) in the vertical direction; the light source being arranged such that, during use, light generated by the light source passes through the barrier layer and the plurality of color elements of the color generating layer; the barrier layer, comprising a stepped barrier pattern of blocking structures and openings extending in the horizontal and the vertical directions, being arranged for defining a viewing angle of the first view and a viewing angle of the second view; and the light source being arranged for generating collimated light.

An embodiment of a method for manufacturing a display device for displaying a first view and a second view, each of the first view and the second view having a respective horizontal viewing angle and a respective vertical viewing angle; the method comprising: arranging a light source for generating collimated light; and providing a stepped barrier pattern of blocking structures and openings extending in the horizontal and the vertical directions such that the blocking structures provide the viewing angle of the first view and the viewing angle of the second view.

BRIEF DESCRIPTION OF DRAWINGS

Below, the invention will be explained with reference to some drawings, which are intended for illustration purposes only and not to limit the scope of protection which is defined in the accompanying claims.

DETAILED DESCRIPTION

Figure 7:
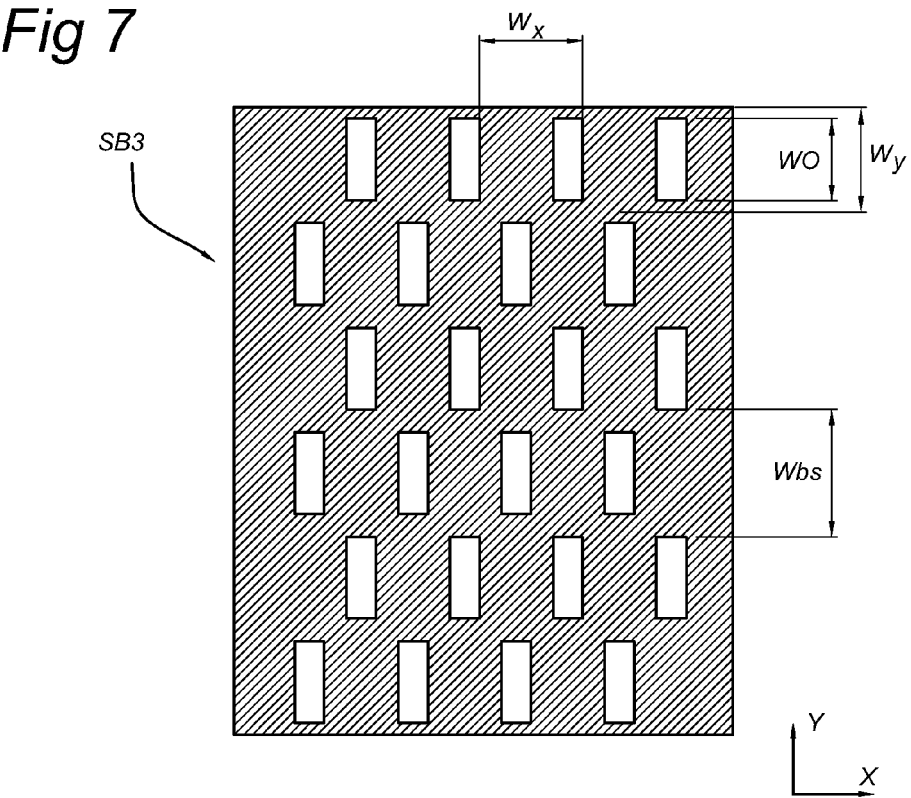
FIG. 7 depicts a third stepped barrier.

FIG. 7 depicts a top view of a third stepped barrier SB3 which is a single barrier layer capable of providing dual view in the horizontal direction. Again, blocking structures BS are indicated by dark areas and openings are indicated by light areas in the barrier layer SB1.

The blocking structures BS are arranged in rows of vertical width Wy. In each row, the blocking structures and openings are shifted stepwise in the horizontal direction X over half of a horizontal width Wx of one blocking structure BS plus one opening in comparison to an adjacent row. Like the first stepped barrier SB1, the third stepped barrier SB3 advantageously provides stepwise arrangement of blocking structures that may provide an increased (horizontal) resolution of perception by a user.

In the third stepped barrier SB3, the vertical width WO of openings is chosen relatively slightly smaller than the vertical pitch Py of a color element (sub-pixel). In fact, the vertical width WO of openings in the third stepped barrier SB3 is smaller than but still close to the width WO of openings as shown in the first stepped barrier SB1. Note that vertical width Wy of the stepped barrier equals the vertical pitch Py of one color element including one metal connection line M.

Figure 4:
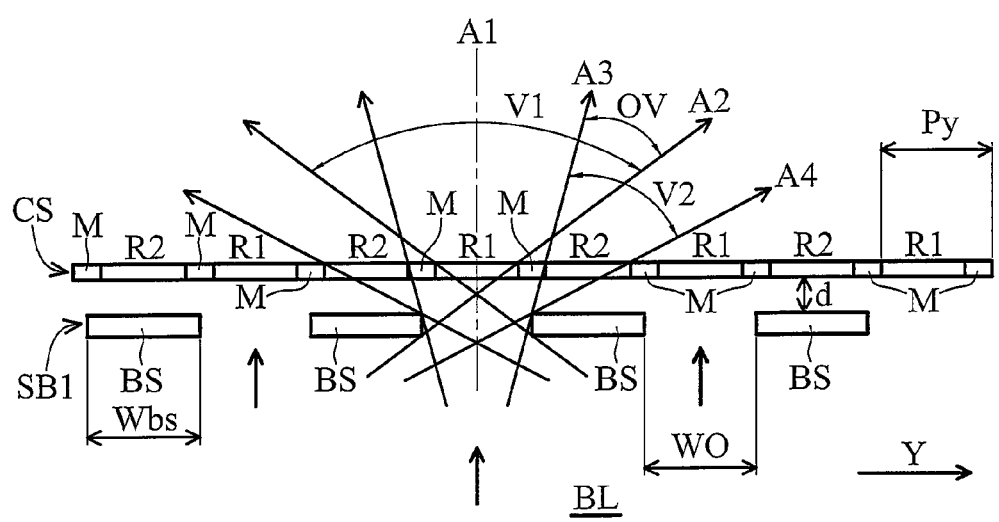
FIG. 4 depicts a vertical cross-section of a dual view display using the first stepped barrier.
Figure 5:
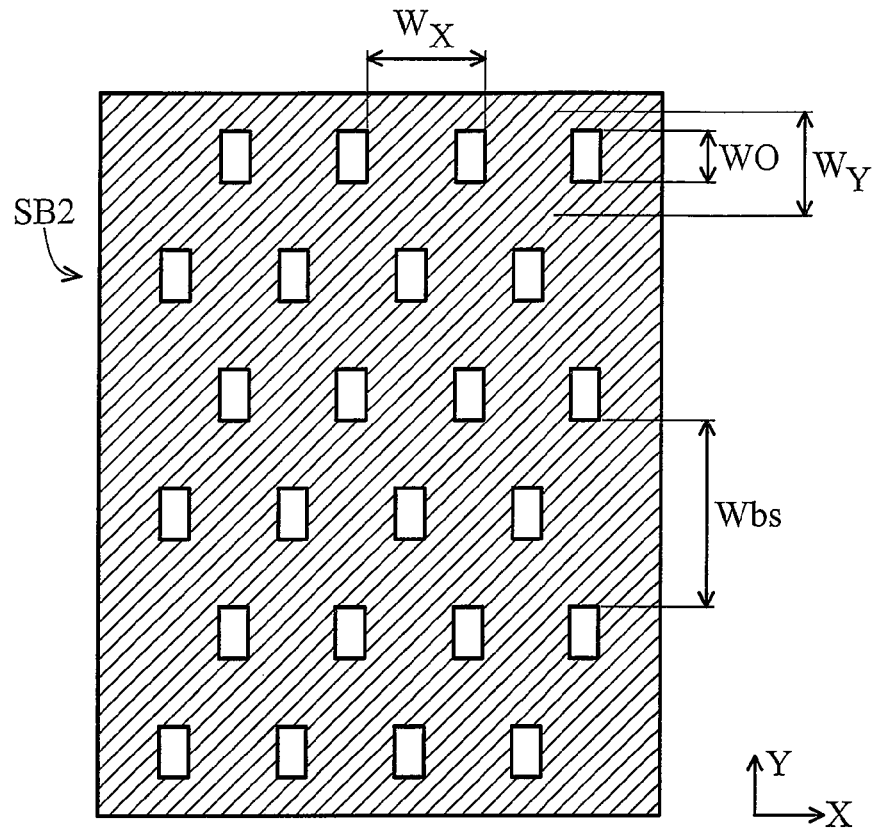
FIG. 5 depicts a second stepped barrier.
Figure 6:
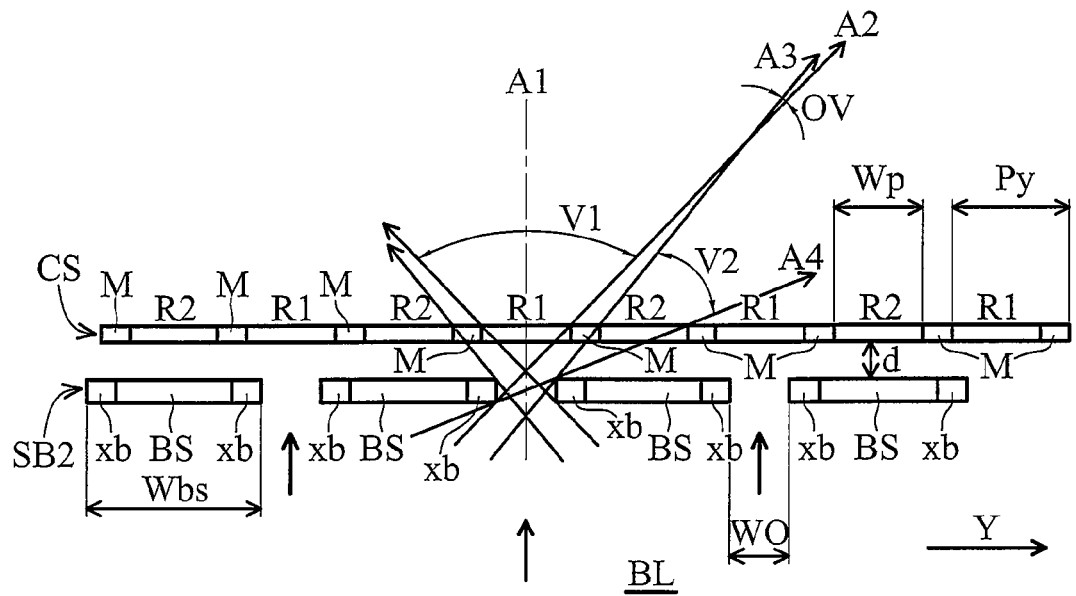
FIG. 6 depicts a vertical cross-section of a dual view display using the second stepped barrier.

As illustrated by the vertical width of openings shown in FIGS. 4 and 6, a dual view display equipped with the third stepped barrier SB3 would exhibit a cross-talk in the vertical direction between the first and second views (other dimensions being equal, as shown in the cross-sections of FIGS. 4 and 6).

It should be recognized that cross-talk can be reduced in a substantially complete manner, by providing in a dual view display the single stepped barrier as shown in FIG. 7 and at the same time providing light blocking means in the sub-pixel design to block light rays that generate cross-talk in (at least) the vertical direction.

In one embodiment, the light blocking means comprises a provision for producing a collimated light beam by the backlight and a provision of non-transparent sub-pixel delineation elements.

Figure 8:
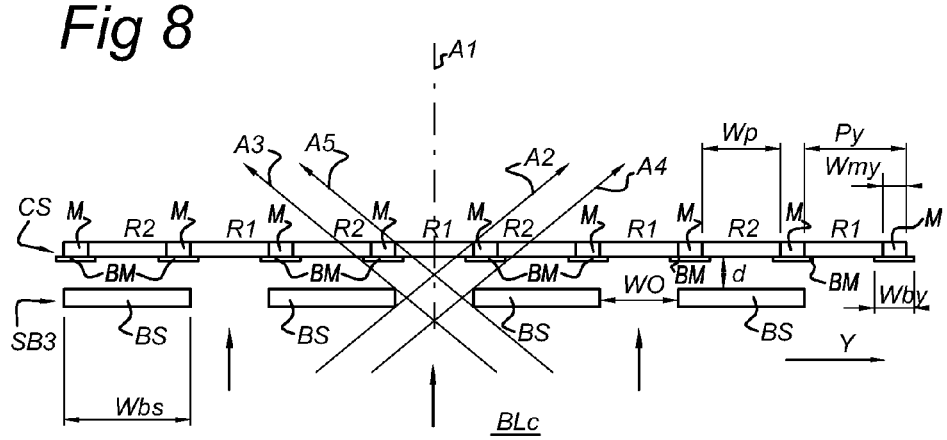
FIG. 8 depicts a vertical cross-section of an embodiment of a dual view display.

FIG. 8 depicts a vertical cross-section of a dual view display according to an embodiment of the present invention using the third stepped barrier SB3 and light blocking means in the sub-pixel design BM. As shown in FIG. 8, the third single stepped barrier SB3 is arranged at the distance d below the color filter plate CF, of which a color stripe CS is shown, for example a stripe of red color elements R. In this arrangement, the elements R1 of the color stripe contribute to the red component of the first view V1 and the elements R2 contribute to the red component of the second view V2.

As described above with reference to FIG. 7, the vertical width WO of the openings of the single barrier layer SB3 is slightly smaller than the vertical pitch Py. Since, in the vertical direction the width Wbs of a blocking structure BS and the width WO of one opening equals two times the vertical pitch Py and WO is chosen slightly smaller than Wy, in this case the vertical width Wbs of one blocking structure BS is slightly larger than the vertical pitch Py (note that Wy equals Py).

In the embodiment of FIG. 8, the delineation element BM is covering the non-transparent metal connection line M as a masking element and the delineation element BM has vertical width Wby that is either larger than or equal to a vertical width Wmy of the metal connection line M. The arrangement of the delineation element BM between the sub-pixels is described in more detail with reference to FIG. 9.

Below the third stepped barrier SB3, a collimated backlight BLc is provided. The collimated backlight Blc exhibits a degree of collimation (i.e., a distribution range of preferred directions of backlight radiation distributed around a preferred main direction of the backlight radiation) that can be tuned with the geometry of the third stepped barrier SB3 in such a way that, beyond the boundary set by arrow A2 of the viewing angle of the first view V1, substantially no light is radiated. Second view V2 is thus substantially not illuminated and therefore can not be observed.

The construction of the viewing angles of the first and second views V1, V2 is shown by arrows A2, A5 and A3, A4, respectively. Arrows A2 and A5 of the viewing angle of the first view V1 coincide with the degree of collimation of the radiation of the collimated backlight Blc, i.e., the radiation of the collimated backlight Blc that passes through the first color element R1 has a distribution substantially confined within the viewing angle V1. Arrows A2 and A5 display the directional boundaries of the collimated radiation.

As a consequence, it follows that light that would be radiated through the openings and that would be passing through the second color element R2, would have substantially the same directional boundaries as indicated by arrows A3 and A4. As mentioned above, since substantially no light is radiated beyond the range between A2 and A5, second view V2 is substantially not illuminated.

Figure 1:
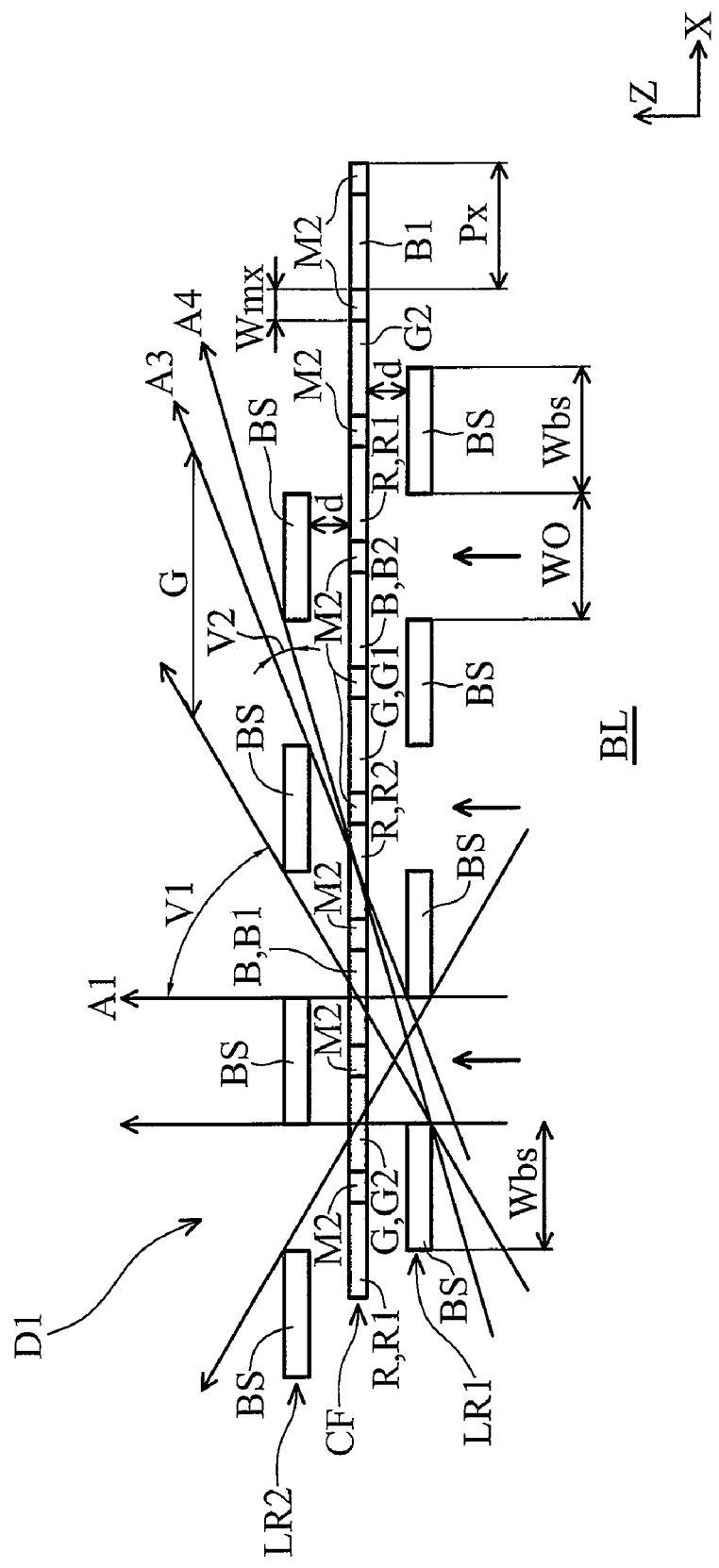
FIG. 1 depicts a cross-section of a dual view display using a double barrier.
Figure 2A:
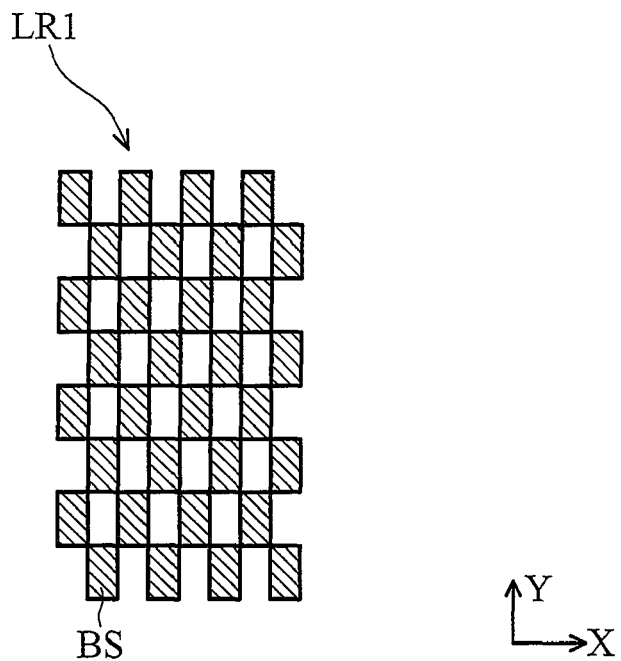
FIGS. 2a, 2b depict a layout of the barrier layers below and above the pixel matrix layer, respectively, as used in the dual view display of FIG. 1.
Figure 2B:
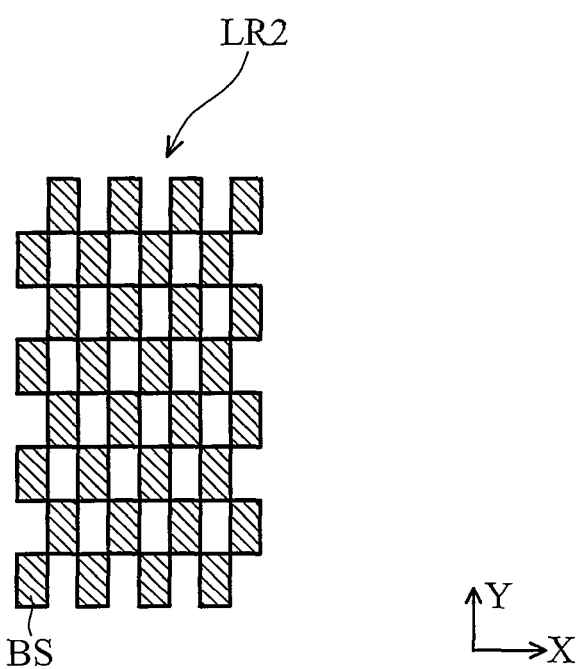
Figure 3:
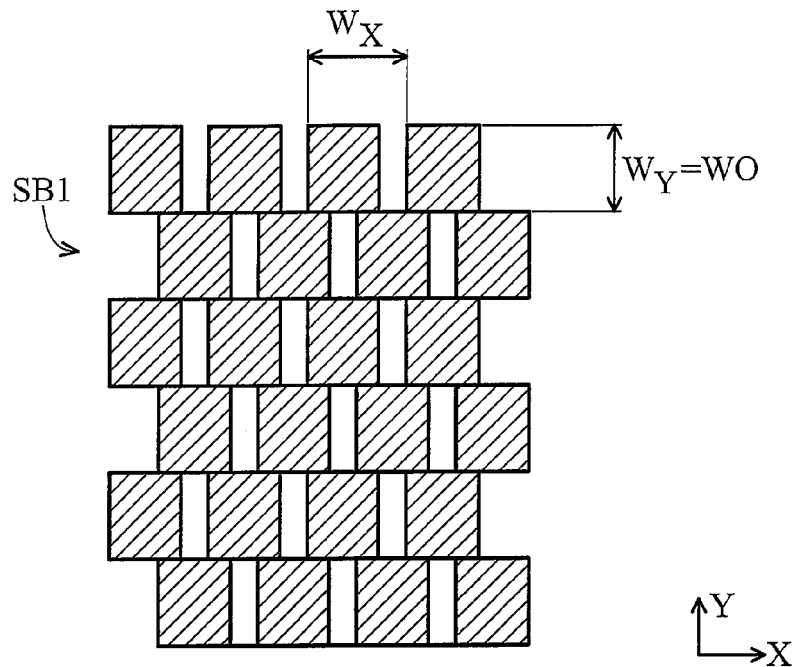
FIG. 3 depicts a first stepped barrier.

In comparison to the stepped barrier SB1 as shown in FIG. 3, the third stepped barrier has a transmission between about 85 and about 98% depending on the differences in the vertical width WO of the openings and the vertical width Wbs of the blocking structures BS between the first stepped barrier SB1 and the third stepped barrier SB3.

It is noted that due to the collimation only, light is substantially radiated in usable viewing directions, i.e., the (horizontal and vertical) viewing directions of the first and second views. Such a collimation is beneficial for reduction of power consumption and heat generation of the dual view display.

It is further noted that in comparison to the first and second stepped barriers SB1, SB2, the vertical width of the non-transparent delineation element BM may be relatively larger for the configuration of the third stepped barrier SB3. Typically, this will not or only slightly affect the aperture of a color element due to the presence of the non-transparent array metals and the TFT circuit that partially covers the color element. This will be explained in more detail below with reference to FIG. 9. By enlarging the non-transparent delineation element BM, the TFT circuit in at least some embodiments may be located (at least partially) below the delineation element BM.

In the arrangement shown in FIG. 8, the barrier layer SB3 is arranged between the collimated backlight BLc and the color filter plate CF. It is noted that, alternatively, the barrier layer SB3 may be arranged above the color filter plate CF, the color filter plate being between the barrier layer SB3 and the collimated backlight BLc.

Figure 9:
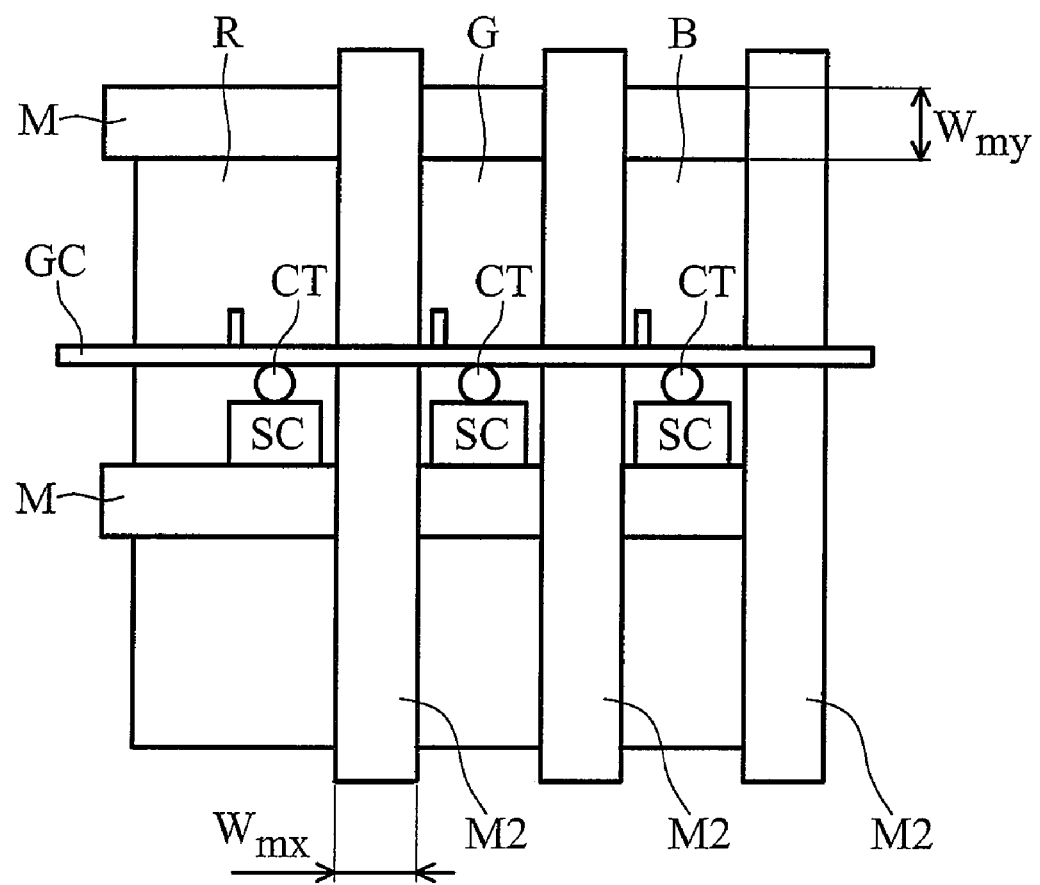
FIG. 9 depicts a top view of a portion of a display.

FIG. 9 depicts a top view of a display as shown in FIGS. 4 and 6. In FIG. 9, a portion of the color filter plate CF is shown with the light switching layer or liquid crystal (LC) layer and array plate superimposed.

The red color element R is adjacent in the horizontal direction X to the green element G, and the green element is next to the blue element B. In the vertical direction the red, green and blue elements are separated by the horizontal metal connection lines M.

In the horizontal direction each color element is separated from vertically adjacent color elements by a vertical metal connection line M2. Next to each horizontal line M may run a gate control line GC.

On a portion of each color element R, G, B an array metal is located which relates to a TFT circuit that may comprise a transistor (not shown), a storage capacitor SC, and a contact CT to a transparent conductive (e.g. ITO) pixel layer. The transistor comprises a gate, a source and drain (not shown). The transistor is arranged for controlling the state of the LC layer as described above. Note that the LC layer is not shown.

Due to the arrangement of metal connection lines M2 and M and gate control lines GC on the array plate next to the color filter plate CF, a matrix of TFT circuits is created, wherein each TFT circuit may be selectively controlled to address the corresponding sub-pixel. It should be noted that the shown arrangement of array metals is an example. Depending on the design of the TFT circuit (also referred to as array design or pixel design) the arrangement of array metals may be different, as will be appreciated by persons skilled in the art.

Figure 10A:
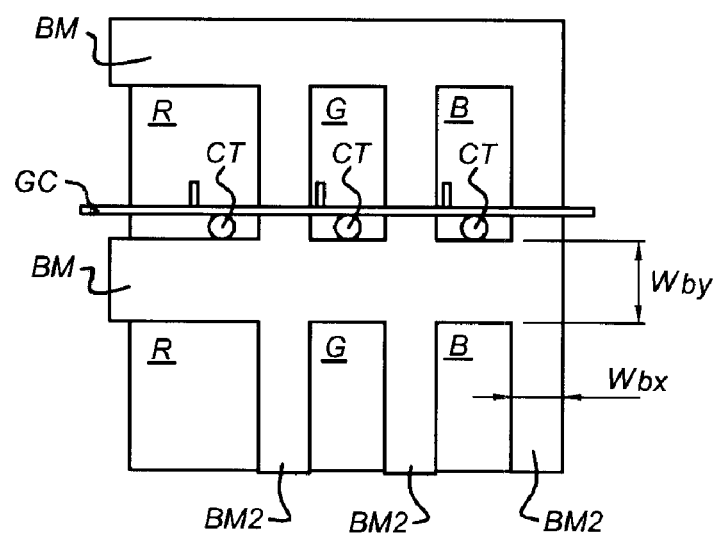
FIGS. 10a, 10b depict a top view of a portion of an embodiment of a display.
Figure 10B:
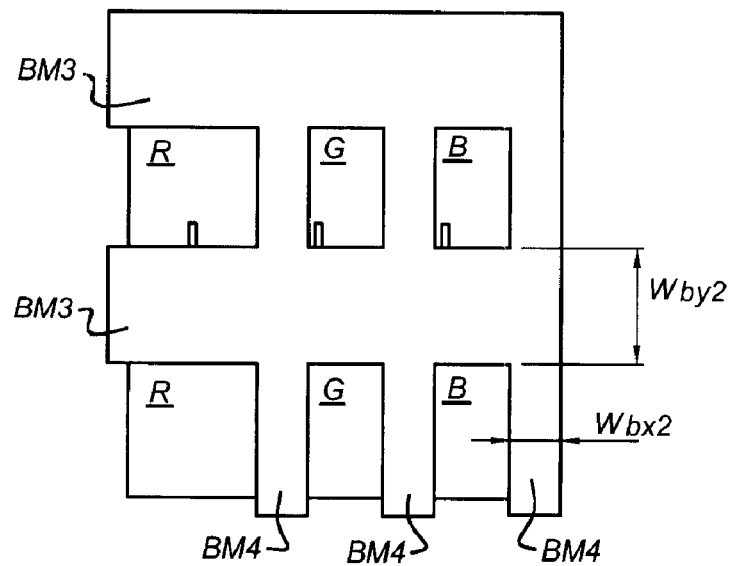

FIGS. 10a, 10b depict a top view of a portion of a display in additional embodiments. In FIG. 10a, a sub-pixel arrangement is shown that is substantially similar to the sub-pixel arrangement as shown in FIG. 9. According to an embodiment of the invention, each sub-pixel is delineated from adjacent sub-pixels by a non-transparent delineation line BM extending in the horizontal direction and by a second non-transparent delineation line BM2 extending in the vertical direction. The non-transparent delineation line BM extending in the horizontal direction is arranged to reduce the cross-talk in vertical direction as described above with reference to FIGS. 7 and 8. In this embodiment, the non-transparent delineation line BM extending in the horizontal direction has a width Wby and is positioned over substantially the sub-pixel area where a portion of the array metals, in this example, the storage capacitor SC and metal connection line M is located. In this embodiment, the width Wby of the non-transparent delineation line BM is at least equal to the width Wmy of the metal connection line M plus the vertical size of the storage capacitor SC.

Since the storage capacitor SC and metal connection line M by itself are non-transparent, application of BM reduces the effective vertical aperture only slightly. Similarly, the non-transparent delineation is applied as second non-transparent delineation lines BM2 in the vertical direction over the vertical metal lines M2. The width Wbx of each second non-transparent delineation line BM2 is substantially equal to the width Wmx of the vertical metal line M2.

In FIG. 10b, a sub-pixel arrangement is shown that is substantially similar to the sub-pixel arrangement as shown in FIG. 9. According to another embodiment, each sub-pixel is delineated from adjacent sub-pixels by a non-transparent delineation line BM3 extending in the horizontal direction and by a second non-transparent delineation line BM4 extending in the vertical direction. The non-transparent delineation line BM3 extending in the horizontal direction is arranged to reduce the cross-talk in vertical direction as described above with reference to FIGS. 7 and 8.

In this embodiment, the non-transparent delineation line BM3 extending in the horizontal direction has a width Wby2 and is positioned over substantially the portion of the sub-pixel area where the storage capacitor SC, the contact CT and the gate control line GC are located. In this embodiment, a width Wby2 of the non-transparent delineation line BM3 is at least equal to the vertical width of the metal connection line M plus the vertical size of the storage capacitor SC, the contact CT and the gate control line GC.

The array metals to be covered may comprise one or more from a group metal connection lines, metal light shields, storage capacitor, storage capacitor lines, gate contact lines and contacts. Since these array metal compounds by them self are non-transparent, application of BM3 over them reduces the effective (vertical) aperture only slightly. Similarly, the non-transparent delineation is applied as non-transparent delineation lines BM4 in the vertical direction over the vertical metal lines M2. The width Wbx2 of each non-transparent delineation line BM4 is substantially equal to the width Wmx of the vertical metal line M2.

Additionally or alternatively, the application of a layer of non-transparent delineation elements BM in itself may advantageously provide a reduction of reflections of light from a backlight on non-transparent and reflective array metals. These reflections may result in an undesired cross-talk between the first and second views which can be suppressed significantly by covering an area of an array metal with a non-transparent delineation element BM.

Figure 13:
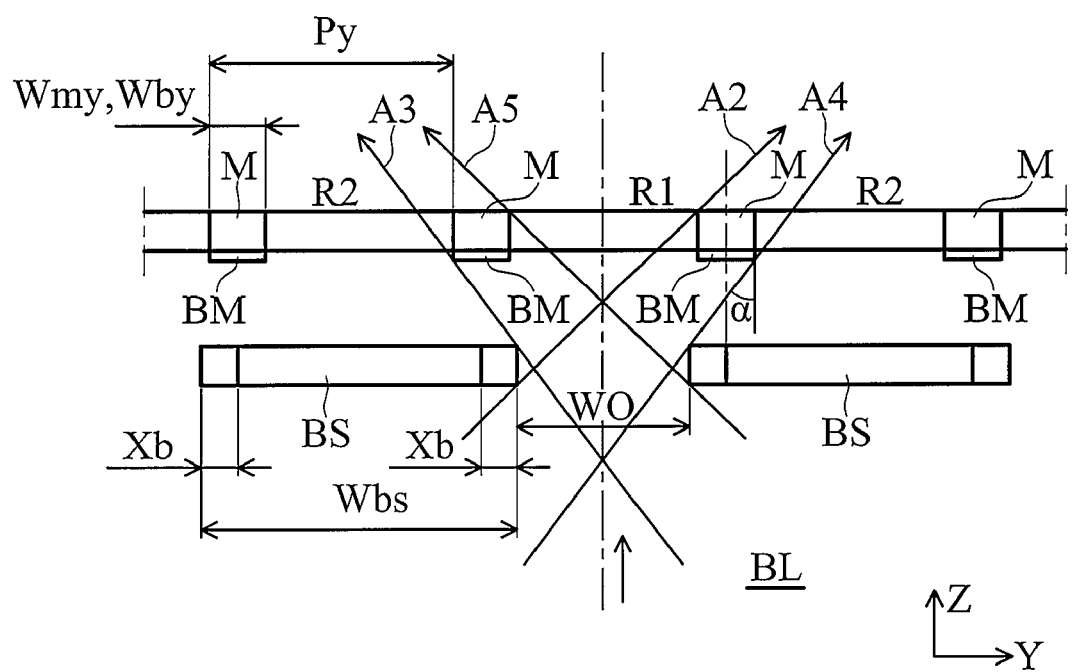
FIG. 13 shows a detail of the cross-section of FIG. 8.

FIG. 13 shows a detail of the cross-section of FIG. 8. In FIG. 13 entities with the same reference number as shown in the preceding figures refer to the corresponding entities in the preceding figures.

The viewing angle of the first view between A2 and A5 that is free from overlap with the second view is limited by the boundaries A3 and A4 of the second view. Note that in the vertical direction the width Wbs of a blocking structure BS plus the width WO of one opening equals two times the vertical pitch Py.

The minimum angle $\alpha$ with the Z direction for the second view V2 is given by $$\alpha = \tan^{-1}\left(\frac{0.5Wby + xb}{d}\right)$$

In the glass carrier of the color filter plate the first view is limited between $+\alpha$ and $-\alpha$. Further, the refraction at the glass-air interface for light rays leaving the panel should be taken into account. This is schematically shown in FIG. 14, wherein $\theta\_out$ is a desired exit angle for light rays (i.e., the vertical boundary angle of the first view).

Figure 14:
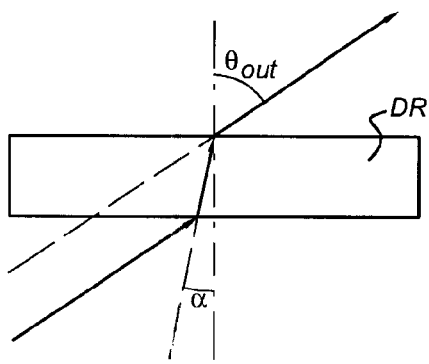
FIG. 14 shows a detail of a light ray passing a glass carrier.

FIG. 14 shows a detail of a light ray passing a glass carrier DR, according to Snell's $$n_{glass}\sin\theta_{in} = n_{air}\sin\theta_{out}$$

law:

wherein $n_{glass}$ is the refraction coefficient of the glass carrier DR, $\theta_{in}$ is the angle within the glass medium, $n_{air}$ is the refraction coefficient in air and $\theta_{out}$ is the exit angle of the light ray.

Using $n_{air}=1$ and $\alpha$ equal to $\theta_{in}$ yields:

$$\theta_{out} = \sin^{-1}\left[n_{glass}\sin\left\{\tan^{-1}\left(\frac{0.5Wby + xb}{d}\right)\right\}\right]$$

As an example, for sub-pixels (color elements) with a vertical size Py of 189 µm and a horizontal size Px of 63 µm including a metal line or light shield M vertical spacing of 17 µm, an angle $\theta_{out}$=30 degrees, $n_{glass}$≈1.52 and a distance d=100 µm, results for the embodiment shown in FIG. 10a in:

Wby=40 µm, xb=14.8 µm, and WO=159.4 µm (full vertical size of BS=218.6 µm=2*Py−WO). For the embodiment shown in FIG. 10b this results in Wby=66 µm, xb=1.8 µm, and WO=185.4 µm (full vertical size of BS=192.6 µm).

Figure 11:
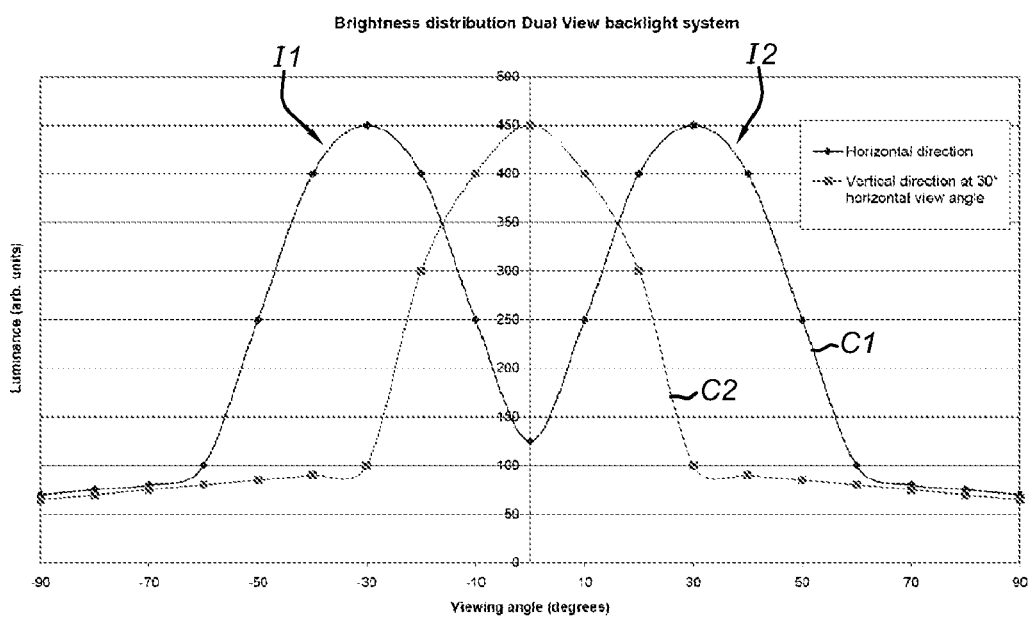
FIG. 11 depicts schematically a luminance distribution for the vertical and horizontal viewing directions of an embodiment of dual view display.

FIG. 11 depicts schematically a luminance distribution for the vertical and horizontal viewing directions of an embodiment of a dual view display module.

The dual view display module of FIG. 11 is an arrangement that comprises a collimated backlight BLc and electronic circuitry for driving the display.

In FIG. 11, the luminance distribution of an exemplary dual view display module is shown as a function of the viewing angle in both horizontal and vertical direction. Along the horizontal axis the viewing angle is plotted, along the vertical axis the luminance of the display module is plotted.

Curve C1 shows a horizontal luminance distribution along the horizontal direction of the dual view display (for example in an automobile). The horizontal luminance distribution C1 shows a first luminance maximum I1 at about −30 degrees, which may correspond to the illumination at a desired viewing angle of the first view V1 for a position of the driver in the automobile (a first user). The horizontal luminance distribution C1 shows a second luminance maximum I2 at about +30 degrees, which may correspond to the illumination of a desired viewing angle of the second view V2 for a position of the passenger in the automobile (a second user). The illumination of the first and second views has a separation at half-width of about 20 degrees (from −10° to +10°).

Curve C2 shows a vertical luminance distribution along the vertical direction of the dual view display at an horizontal viewing angle of −30 or +30 degrees. The vertical luminance distribution C2 in this example shows a maximum around 0 degrees (i.e., perpendicular to the plane of the display). Due to the collimation of light produced by the collimated backlight BLc, the luminance is confined (in this example) within an opening angle of 60 degrees (from −30 to 30 degrees in vertical direction).

It is noted that the angular values shown here are mere examples: a dual view display may be arranged with any viewing angle in both vertical and horizontal direction as required for any given arrangement of the display and/or windscreen and/or positions of driver and passenger.

Figure 12A:
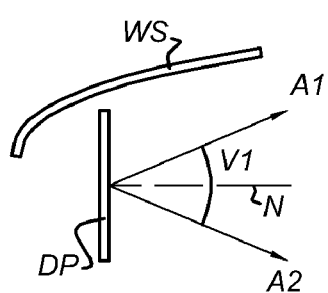
FIGS. 12a and 12b depict schematically a vertical distribution of viewing angle below a front windscreen of an automobile.
Figure 12B:
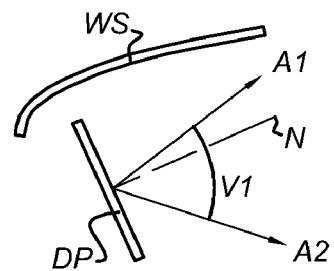

FIGS. 12a and 12b depict schematically a vertical distribution of viewing angle below a front windscreen of an automobile. In particular, an embodiment of a dual view display D2 according to the present invention, equipped with the third stepped barrier SB3, non-transparent delineation elements BM, BM2; BM3, BM4 and a collimated backlight BLc is schematically depicted below a front windscreen WS of an automobile. The display D2 may be located on a dashboard or on a console in between the seats of a driver and a passenger.

FIG. 12a depicts a dual view display with a vertical viewing angle centered around a normal N of a plane DP of the display. FIG. 12b depicts a dual view display with a vertical viewing angle tilted relative to the normal N of the plane DP of the display.

A tilt of the vertical viewing angle relative to the normal N of the plane DP can be realized by adjusting the vertical position of the openings in the stepped barrier SB3 relative to the vertical position of the color elements in the color filter plate CF. Thus, the display can be positioned in a vertically tilted position within the automobile.

Likewise, the horizontal luminance distribution C1 as shown in FIG. 11 is symmetrical around the normal N of the plane DP of the display, but the horizontal luminance distribution can be shifted to an asymmetrical distribution relative to the normal of the plane of the display, by adjusting the horizontal position of the openings in the stepped barrier SB3 relative to the horizontal position of the color elements in the color filter plate CF.

In FIGS. 12a and 12b, the first view V1 intended for the driver is displayed within the boundaries A1, A2. Above boundary A1 and below boundary A2 a reproduction of the second view is unwanted, since this second view may reflect in the windscreen WS or may be directly visible to the driver. Accordingly, the second view is cancelled by the stepped barrier SB3 in combination with the non-transparent delineation elements BM, BM2; BM3, BM4 and the collimated backlight radiation BLc By canceling the second view as described above, at least some embodiments of a dual view display can be fabricated without a Louvre film (LCF film). Such a Louvre film is intended for avoiding reflection of the display in the windscreen. Advantageously, the Louvre film can be omitted from the dual view display design, by which costs can be reduced. Moreover, since the Louvre film on a display would reduce the brightness of that display by about 30%, a collimated backlight BLc with relatively less intensity can be used, which results in lower power consumption.

Further, it is noted that in at least some of the embodiments of such a display, the color filter plate may comprise additional color elements next to the red, green and blue color elements, for example, a white sub-pixel next to the red, green and blue color elements.

Figure 15:
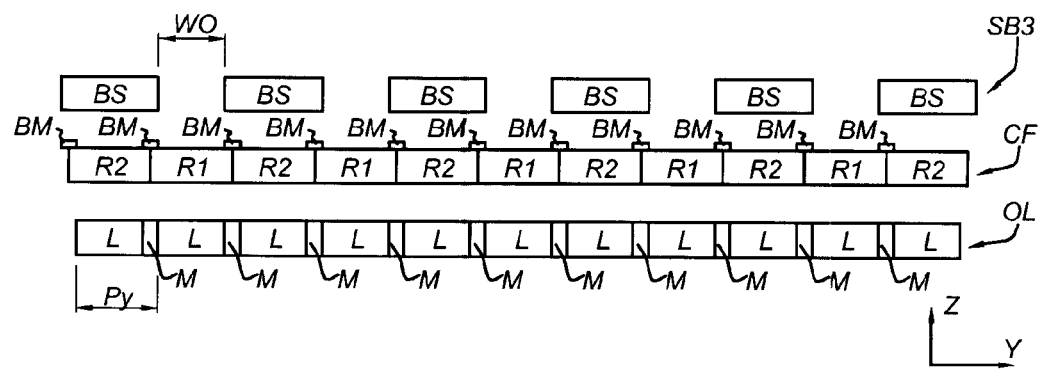
FIG. 15 shows a cross-section of a further embodiment of a dual view display.

FIG. 15 is a schematic a cross section of a further embodiment of a dual view display. Specifically, this embodiment incorporates an array of organic light emitting diodes (OLEDs) indicated below as LED elements L. In the vertical cross-section as shown in FIG. 15, entities with the same reference number as shown in the preceding figures refer to the corresponding entities in the preceding figures.

In a first light emitting layer OL, the LED elements L are arranged in an array. Between the individual LED elements, metal interconnection lines M may be located that extend in the direction X (perpendicular to the YZ plane of drawing). The LED elements L are each arranged to produce an individual (collimated) light beam and can be addressed individually as a sub-pixel.

In this example, the LED elements L are LEDs arranged for emission of 'white light' (i.e., an ensemble of light components with various wavelengths that produces at least a perception of white light). Above the light emitting layer OL a color filter plate CF that comprises color elements is located. Similar as in the preceding figures a color stripe of red elements R1, R2 is shown in this cross-section. Note that in this embodiment, the color filter plate is indicated without an array plate.

Above the color filter plate, non-transparent delineation elements BM are located on the boundaries between adjacent color elements R1, R2 in the color stripe. Then, above the layer of delineation elements BM, the stepped barrier SB3 as described above with reference to FIGS. 7 and 8 is located.

Alternatively, instead of white light producing LED elements L, the LED elements L may be LED elements producing a (collimated) light beam of a particular color: e.g., red, green or blue. In that case, the color filter plate may be omitted. The non-transparent delineation elements BM are then located (printed) at the boundaries between adjacent LED elements. Above the layer of delineation elements BM, the stepped barrier SB3 as described above with reference to FIGS. 7 and 8 is located.

It is noted that the arrangement of OLEDs as shown is a so-called stack-up arrangement, emitting light along direction Z. It is conceivable that OLEDs may be arranged in another arrangements for emitting light along the direction Z.

Further it is noted that in a display according to this embodiment of the present invention, OLEDs may comprise additional color elements next to the red, green and blue color elements. Such an additional color element may be for example, a white sub-pixel.

In a further embodiment, a dual view display device may be arranged as a switchable display device using barrier technology to create 2D (two-dimensional) imaging in one mode and 3D (three-dimensional) imaging in another mode, the modes being switchable by a mechanism such as one known in the art. In both modes, the dual view of the first view V1 and the second view V2 can be generated.

In yet a further embodiment, a dual view display device may be arranged as a display device using barrier technology to create 3D (three-dimensional) imaging, the imaging being created by a mechanism such as one known in the art. In the 3D imaging mode, the dual view of the first view V1 and the second view V2 can be generated.

While specific embodiments of the invention have been described above, it will be appreciated that the invention may be practiced otherwise than as described. The descriptions above are intended to be illustrative, not limiting. It will be apparent to one skilled in the art that modifications may be made to the invention as described without departing from the scope of the claims set out below.

The invention claimed is:

1. A display device for displaying a first view and a second view, each of the first view and the second view having a respective horizontal viewing angle and a respective vertical viewing angle, the display device comprising:
   a color generating layer;
   a barrier layer (SB3);
   a light source;
   a plurality of non-transparent metal connection lines (M); and
   a plurality of delineation elements (BM);
   the color generating layer comprising a plurality of color elements of at least red elements, green elements, and blue elements, the plurality of color elements being arranged as pixel elements, each pixel element comprising at least one of the red elements, one of the green elements and one of the blue elements, the pixel elements being arranged in a horizontal direction and in a vertical direction;
   each color element having a pitch (Py) in the vertical direction;
   the light source being arranged such that, during use, light generated by the light source passes through the barrier layer and the plurality of color elements of the color generating layer;
   the barrier layer, comprising a stepped barrier pattern of blocking structures and openings extending in the horizontal and the vertical directions, being arranged for defining a viewing angle of the first view and a viewing angle of the second view;
   the blocking structures having a blocking width in the vertical direction, the openings having an opening width in the vertical direction;
   the opening width in the vertical direction being either equal to or smaller than the pitch (Py) of one of the plurality of color elements in the vertical direction; and
   the light source being arranged for generating collimated light;
   each non-transparent metal connection line (M) being located at an interface area between two vertically adjacent ones of the plurality of color elements;
   each the non-transparent metal connection line (M) being covered by and being in direct contact with one of the delineation elements (BM); and
   vertical width (Wby) of delineation elements (BM) being larger than vertical width (Wmy) of the non-transparent metal connection lines (M).

2. The display device according to claim 1, wherein the light source is a backlight, and the color generating layer is a color filter plate (CF).

3. The display device according to claim 2, wherein the barrier layer is located between the backlight and the color filter plate.

4. The display device according to claim 2, the color filter plate is located between the backlight and the barrier layer.

5. The display device according to claim 1, further comprising a light-switching layer comprising light switching elements that are individually associated with a single color element for controlling a transmission of light, during use, through that single color element and wherein the light switching elements are arranged for assigning one half of the plurality of pixel elements to the first view (V1) and another half of the plurality of pixel elements to the second view (V2);
   each light switching element being connected to array metals comprising at least a horizontal metal connection line (M), a vertical metal connection line (M2), storage capacitor line, a storage capacitor (SC) and a contact (CT);
   the array metals covering a portion of each of the color elements;
   the non-transparent delineation line element (BM; BM3) covering at least the horizontal metal connection line and the storage capacitor.

6. The display device according to claim 1, wherein at least one of the non-transparent delineation line elements covers the vertical metal connection line.

7. The display device according to claim 1, wherein the non-transparent delineation line elements cover a portion of the array metals in each of the plurality of color elements.

8. The display device according to claim 1, wherein the light source is an array of light emitting devices, each of the light emitting devices being arranged for producing white light and being associated with one of the color elements of the color generating layer.

9. The display device according to claim 8, wherein the color generating layer is a color filter plate.

10. The display device according to claim 8, wherein the light source comprises the color generating layer, each of the light emitting devices being arranged as a color element for producing light of that color.

11. The display device according to claim 8, wherein the color generating layer is arranged between the light source and the barrier layer.

12. The display device according to claim 8, wherein each light emitting device in the array of light emitting devices is connected to array metals comprising at least a horizontal metal connection line, and a vertical metal connection line the non-transparent delineation line element covering at least the horizontal metal connection line.

13. The display device according to claim 12, wherein the non-transparent delineation line element covers the vertical metal connection line (M2).

14. The display device according to claim 1, wherein the light source for producing collimated light exhibits a degree of collimation tuned with the barrier pattern of the barrier layer and the non-transparent metal connection lines in such a way that during use the vertical viewing angle of the first view coincides with the degree of collimation of produced collimated light.

15. The display device according to claim 1, wherein the light source for producing collimated light exhibits a degree of collimation tuned in such a way that during use, substantially no light is radiated beyond boundaries of the vertical viewing angle of the first view and the second view is not illuminated.

16. The display device according to claim 1, wherein the plurality of color elements of each color is arranged in adjacent color stripes, the color stripes being adjacent in the horizontal direction and extending in the vertical direction.

17. The display device according to claim 16, wherein color elements arranged in one color stripe alternately contribute to the first view and the second view.

18. The display device according to claim 1, wherein the blocking structures and openings are alternately arranged in a plurality of rows that extend in the horizontal direction, in each row the blocking structures and openings being shifted stepwise, in comparison to an adjacent row, along the horizontal direction over half of a horizontal step width of one blocking structure plus one opening.

19. The display device according to claim 1, wherein the collimation of the light source in the vertical direction is arranged for substantially radiating light along the vertical direction in viewing directions of the first view and the second view.

* * * * *